Figure 1:
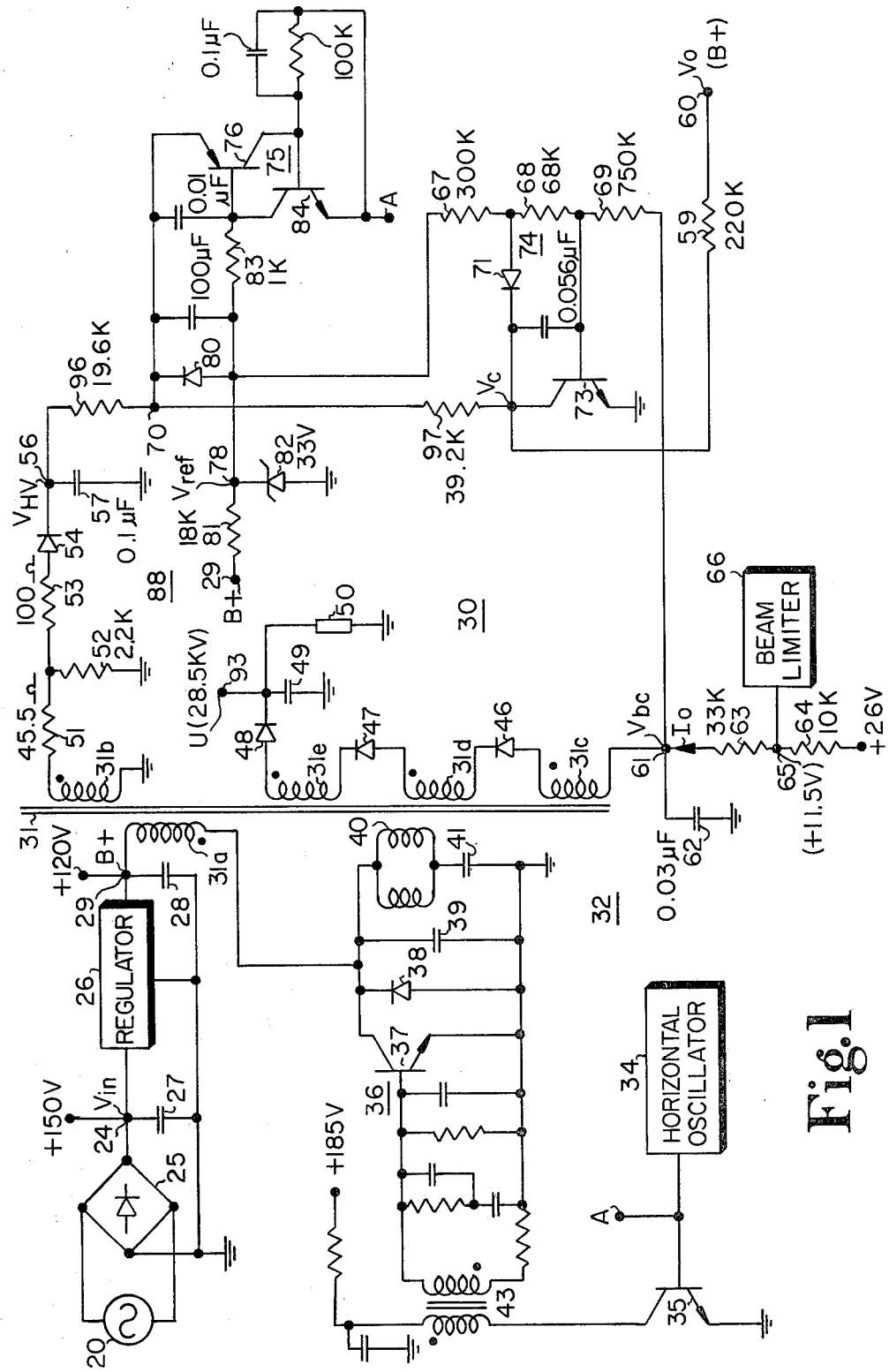

United States Patent [19]

Hicks

[11] 4,343,028

[45] Aug. 3, 1982

[54] TELEVISION RECEIVER HIGH VOLTAGE GENERATOR PROTECTION CIRCUIT

[75] Inventor: James E. Hicks, New Palestine, Ind.

[73] Assignee: RCA Corporation, New York, N.Y.

[21] Appl. No.: 226,580

[22] Filed: Jan. 21, 1981

[51] Int. Cl.³ .......................................... H02H 3/20
[52] U.S. Cl. ................................. 361/91; 315/411;
 328/9; 358/190; 358/243; 361/79; 361/88
[58] Field of Search ................ 361/79, 91, 88, 86;
 358/190, 243; 315/383, 411, 384, 385; 328/8, 9

[56] References Cited

U.S. PATENT DOCUMENTS

| | | | |
|---|---|---|---|
| 3,692,932 | 9/1972 | Wilmarth | 178/7.5 R |
| 3,725,739 | 4/1973 | Griffey | 317/16 |
| 3,898,522 | 8/1975 | Klein | 315/379 |
| 4,042,858 | 8/1977 | Collette et al. | 315/379 |
| 4,045,742 | 8/1977 | Meehan et al. | 328/9 |
| 4,073,004 | 2/1978 | Chambers et al. | 363/79 |
| 4,126,816 | 11/1978 | Willis | 315/411 |
| 4,185,234 | 1/1980 | Baker | 315/411 |
| 4,213,166 | 7/1980 | Watanabe | 361/86 |
| 4,234,829 | 11/1980 | Willis | 358/243 X |
| 4,287,535 | 9/1981 | Vakil | 358/243 |

OTHER PUBLICATIONS

RCA Television Service Data, File 1980 C-2, Chassis CTC107 Series, pp. 1, 13, 14, 24–29, & Electrical Schematic, Copyright 1980.
Hitachi CU-150 Solid State Color Television Service Manual No. 344, CQ3DX Chassis, pp. 1–9, & Electrical Schematic, Oct. 1976.
Electrical Schematic, Magnavox T989 Color Television Chassis, Manual No. 7343, Section 4.1, Fourth Issue, Mar. 1975.
ET/D Magazine, p. 9, Aug. 1978, —Magnavox T989 Chassis.
RCA Publication, "Servicing the CTC99 & 101 Color Chassis", pp. 1, 3, 32–35, 38, 39, 44–69, Copyright 1979.
RCA Television Service Data, File 1980 (CCN-) C-7, Chassis CTC101 Series, pp. 1, 13, 38–43 and Electrical Schematic, Copyright 1980.
RCA Publication, "CTC108 Television Workshop, Servicing The CTC108 XL-100 Color Chassis," Training Man. WS21, pp. 1, 3, 48 and 49, copyright 1980.

Primary Examiner—Reinhard J. Eisenzopf
Attorney, Agent, or Firm—P. J. Rasmussen; W. H. Meise; J. J. Laks

[57] ABSTRACT

A high voltage generator of a television display is responsive to an alternating voltage, such as a retrace pulse voltage, for developing an ultor voltage at an ultor terminal. A protection circuit for the high voltage generator includes a comparator that develops a television display disabling signal when activated. A circuit that develops a sense voltage representative of the ultor voltage is coupled to an input terminal of the comparator so as to develop the disabling signal when the ultor voltage exceeds a predetermined level. To provide an overload disabling capability, an ultor beam current sensing circuit is coupled to the input terminal of an operational amplifier. The output terminal of the amplifier is coupled to a bias voltage source and to an input terminal of the comparator. When the ultor beam current exceeds a predetermined level indicative of high voltage generator overload operation, the operational amplifier applies the bias voltage to the comparator input to energize the comparator into developing the disabling signal. The magnitude of the bias voltage is such as to activate the comparator in substantial independence of the value of the ultor voltage sense voltage.

14 Claims, 2 Drawing Figures

TELEVISION RECEIVER HIGH VOLTAGE GENERATOR PROTECTION CIRCUIT

This invention relates to a television display high voltage generator protection circuit.

In a typical television display system, a high voltage, DC ultor voltage is applied to the final anode electrode of a picture tube to accelerate onto a phosphor screen an electron beam generated at the picture tube cathode. To insure that the television receiver is not operated under fault conditions at excessive ultor voltage levels, many television receivers incorporate a high voltage protection circuit which disables normal television receiver operation when the generator ultor voltage approaches unacceptable values.

In a copending U.S. patent application of D. H. Willis, Ser. No. 120,473, filed Feb. 11, 1980, entitled "Television Receiver High Voltage Protection Circuit", herein incorporated by reference, a high voltage protection circuit is described that varies the ultor voltage disabling threshold value as a function of beam current loading and that includes an overcurrent shutdown or disabling function which disables normal television display operation under excessive beam current loading conditions on the ultor terminal. Such an overcurrent shutdown function is desirable to avoid damage to the television receiver circuits during overcurrent conditions such as may occur due to failure of the automatic brightness limiter circuit or as may occur due to short-circuited electrodes in the picture tube.

A feature of the invention is to design a high voltage protection circuit for a high voltage generator that includes an overcurrent shutdown capability that is activated under overload current conditions in substantial independence of the level of the sensed high voltage being developed during the overload condition. A high voltage generator responsive to an alternating voltage, such as a retrace pulse voltage, develops an ultor voltage at an ultor terminal. A protection circuit includes a comparator for developing a television display disabling signal when the comparator is activated. An ultor voltage representative sense voltage is applied to the comparator to activate it so as to develop the disabling signal when the ultor voltage exceeds a predetermined level. A circuit responsive to the ultor beam current sense voltage applied a bias voltage to an input terminal of the comparator only when the ultor beam current exceeds a predetermined level indicative of abnormal high voltage generator operation. The bias voltage, when applied to an input terminal of the comparator, activates the comparator so as to develop the disabling signal in substantial independence of the ultor voltage representative sense voltage being applied to the comparator at the moment of activation.

Figure 2:
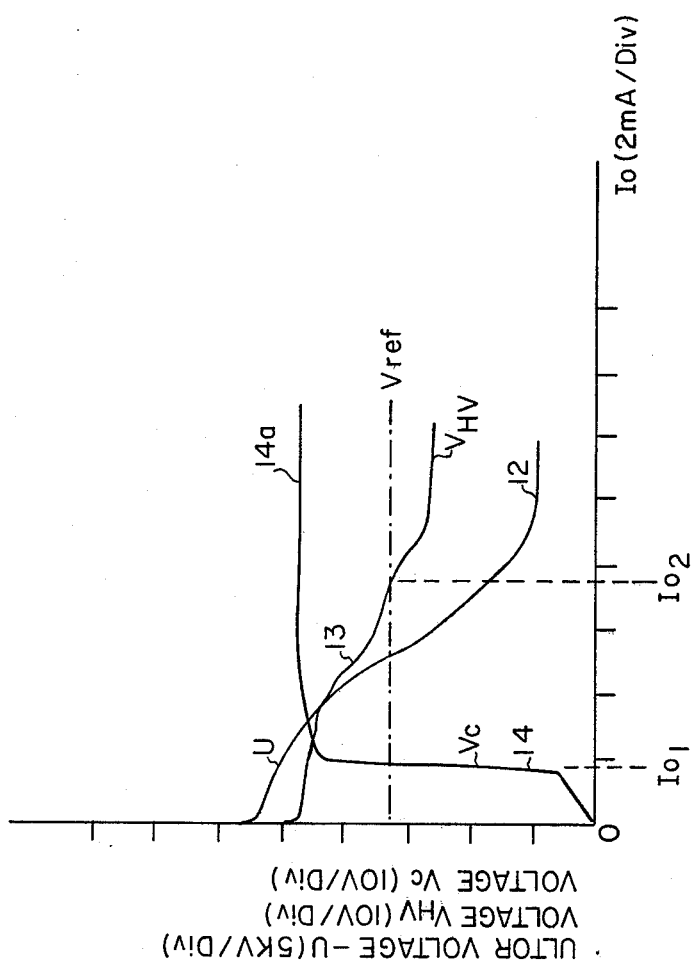

FIG. 1 illustrates a deflection and power supply circuit, including a high voltage generator protection circuit embodying the invention; and FIG. 2 illustrates curves associated with the operation of the circuit of FIG. 1.

In the deflection and power supply circuit of a television display or television receiver, illustrated in FIG. 1, a mains supply voltage from a source 20 is rectified by a full-wave bridge rectifier 25 and filtered by a filter capacitor 27 to develop an unregulated DC supply voltage, $V_{in}$, of illustratively +150 volts, at a terminal 24. A voltage regulator 26 develops a regulated B+ scan supply voltage, of illustratively +120 volts DC, at a B+ terminal 29 from the voltage $V_{in}$. A filter capacitor 28 is coupled to terminal 29. The B+ scan supply voltage energizes a horizontal deflection generator 32.

Horizontal deflection generator 32 includes a horizontal oscillator 34, a driver transistor 35, a driver transformer 43, and a horizontal output stage 36. Horizontal output stage 36 comprises a horizontal output transistor 37, a damper diode 38, a retrace capacitor 39, and the series arrangement of a horizontal deflection winding 40 and an S-shaping capacitor 41.

After horizontal output transistor 37 is cut off, a retrace pulse voltage is developed across horizontal deflection winding 40. The retrace pulse voltage is applied to a primary winding 31a of a flyback transformer 31 to develop retrace pulse voltages in the various secondary windings of the flyback transformer including windings 31b–31e, illustrated in FIG. 1. Windings 31c–31e are part of a high voltage generator 30. Stepped-up pulse voltages developed across high voltage windings 31c–31e are rectified by diodes 46–48, filtered by a capacitance 49 to develop a DC ultor high voltage U at an ultor terminal 93 for the ultor load of the television picture tube, illustrated schematically in FIG. 1 as an impedance 50.

The DC path for ultor beam current flowing from ultor terminal 93 to ultor load 50 is from a terminal 65 through a resistor 63 to a terminal 61 coupled to the bottom of high voltage winding 31c. Terminal 65 is the junction terminal of a voltage divider comprising resistor 63 and a resistor 64 coupled between terminal 61 and a +26 volt DC supply. A conventional beam limiter circuit 66 is coupled to terminal 65 and there maintains the voltage at a constant level until beam limiting action begins. Terminal 61 therefore comprises a beam current sense terminal, and the voltage $V_{bc}$ developed at terminal 61 represents an ultor beam current representative sense voltage which varies with variations in the ultor beam current being drawn from ultor terminal 93.

A high voltage protection circuit 88 disables normal television receiver operation under fault conditions, such as during the generation of excessive ultor high voltage at terminal 93. Protection circuit 88 includes flyback transformer secondary winding 31b which develops an ultor high voltage representative sense voltage $V_{HV}$ at an ultor sense terminal 56, a beam current sense signal amplifying transistor 73, a comparator transistor 76, and a latching or disabling transistor 84. A voltage divider comprising resistors 51 and 52 is coupled across secondary winding 31b. The retrace pulse voltage developed across winding 31b is divided and applied to the anode of a diode 54 through a resistor 53. The peak rectified retrace pulse is filtered by a capacitor 57 to produce the DC voltage $V_{HV}$ that is representative of the retrace pulse amplitude and, thus, is a sense voltage representative of the magnitude of the ultor voltage being developed at ultor terminal 93.

The ultor voltage sense voltage terminal 56 is coupled through a resistor 96 to the input emitter electrode terminal 70 of comparator 76. A +33 volts reference voltage $V_{ref}$ developed at a terminal 78 is applied through a resistor 83 to the input base electrode of comparator 76. The reference voltage $V_{ref}$ is developed across a voltage reference diode 82, with the diode bias current being supplied from B+ terminal 29 through a resistor 81. A diode 80 is coupled between terminal 78 and the emitter input electrode of comparator 76, with the cathode of diode 80 being coupled to the emitter.

Comparator transistor 76 and disabling transistor 84 are of opposite conductivity types and are coupled together so as to form a regenerative latching arrangement 75. The output or emitter electrode of disabling transistor 84 is coupled to horizontal deflection generator 32 at a terminal A, at the base electrode terminal of horizontal driver transistor 35.

Under normal ultor voltage and beam current operating conditions, diode 80 is conductive and comparator transistor 76 is nonconductive, preventing any base current from flowing in disabling transistor 84, and maintaining transistor 84 in the off state. Under a fault condition, such as excessive ultor voltage, the ultor sense voltage $V_{HV}$ increases sufficiently to at least momentarily reverse bias diode 80 and forward bias the base-emitter junction of comparator transistor 76. Output current flows from the collector electrode of comparator 76 to energize disabling transistor 84 and regeneratively turn on latch 75 to maintain both transistors regeneratively conducting.

When disabling transistor 84 becomes energized under a fault condition, the emitter current of disabling transistor 84 flows into the base of horizontal driver transistor 35, turning the transistor on and maintaining it continously conducting as long as latch 75 is energized. The horizontal deflection rate switching voltage for horizontal output transistor 37 is no longer being developed, thereby disabling high voltage generator 30, removing the ultor voltage from terminal 93, and presenting an abnormal display to the television receiver observer. When the television receiver is turned off, B+ voltage is removed from terminal 29, deenergizing latch 75, enabling the resumption of normal television receiver operation if the fault condition is not a persistent one.

To provide beam current information to comparator transistor 76 of high voltage protection circuit 88, the beam current sense voltage $V_{bc}$ developed at current sense terminal 61 is applied to the base of transistor 73 through a resistor 69 of a voltage divider comprising resistors 67–69 coupled between the +33 volt reference terminal 78 and current sense terminal 61. The voltage at the base of transistor 73 varies directly with variations in the beam current sense voltage $V_{bc}$. For very light beam current loading on ultor terminal 93, transistor 73 is in saturated conduction. As the beam current loading increases, the sense voltage $V_{bc}$ decreases and brings transistor 73 out of saturated conduction into linear operation.

In the linear mode of operation, transistor 73 functions as an operational amplifier with degenerative feedback between the collector output electrode and the base input electrode. The degenerative or negative feedback is provided by a feedback circuit 74 comprising resistor 68 and a forward biased diode 71. Because of the negative feedback, the collector voltage $V_c$ of amplifier transistor 73 is proportional to the transistor base voltage and is thus representative of the magnitude of beam current loading on ultor terminal 93. As the beam current loading increases, the collector voltage of amplifier transistor 73 also increases.

The beam current representative collector voltage of transistor 73 is applied through a resistor 97 to the emitter input electrode of comparator transistor 76. While amplifier transistor 73 is in the linear, negative feedback mode of operation, a summed voltage, comprising the proportional sum of an ultor voltage sense voltage and an ultor beam current sense voltage, is developed under fault conditions by voltage dividing resistors 96 and 97. The summed voltage reverse biases diode 80, and activates comparator transistor 76 when the difference between the summed voltage and the reference voltage approximately exceeds the base-emitter threshold level of comparator transistor 76.

Amplifier transistor 73 also enables high voltage protection circuit 88 to shut down high voltage generator 30 when ultor terminal 93 is overloaded, as may occur, for example, when beam limiter 66 fails. If beam current loading of ultor terminal 93 increases above a predetermined overload value, the collector voltage $V_c$ of amplifier transistor 73 increases to a value which reverse biases feedback diode 71, thereby open-circuiting the negative feedback path between collector and base of transistor 73. With the feedback path open-circuited, any further slight increase in the beam current loading will reduce the base voltage of transistor 73 sufficiently to bring the transistor into cutoff.

With transistor 73 cut off, current from ultor voltage sense terminal 56 is no longer being diverted to resistor 96 and away from the emitter of comparator transistor 76. The ultor voltage sense voltage $V_{HV}$ is of sufficient magnitude, under certain overload conditions, to reverse bias diode 80 and forward bias the base-emitter junction of comparator transistor 76, enabling disabling latch 75 to be energized.

A feature of the invention is to insure high voltage generator shutdown under all overload conditions. In accordance with the invention, an additional source of bias voltage $V_O$, at a terminal 60, is coupled to the output collector electrode of amplifier transistor 73 through a resistor 59. The bias voltage $V_O$ may comprise the B+ voltage developed at terminal 29, with terminal 60 being directly connected to terminal 29.

By being coupled to the collector output terminal of amplifier transistor 73, the bias voltage $V_O$ is applied to comparator 76 only when amplifier transistor 73 becomes cut off, when the ultor beam current loading exceeds a predetermined level indicative of an unsafe overload high voltage generator operating condition. The magnitude of the bias voltage $V_0$ is such that when the bias voltage is applied to the input terminal of the comparator, the comparator is activated and develops the disabling signal in substantial independence of the exact value of the ultor voltage sense voltage $V_{HV}$ being developed at terminal 56 at the moment that amplifier transistor 73 becomes cut off. Such independence of action by the overcurrent shutdown portion of high voltage protection circuit 88 is desirable to insure television receiver disabling under all overload conditions.

High voltage generator 30 may be considered as a power supply that develops an output voltage, ultor voltage U, at an output terminal, ultor terminal 93, and that provides load current, as represented by the current $I_0$, to a variable load, ultor load 50. Curve 12 of FIG. 2 illustrates a curve of the ultor load voltage U generated at ultor terminal 93 versus beam current loading $I_0$ by ultor load 50. In general, the ultor voltage U decreases with increasing beam current loading $I_0$.

The ultor voltage sense voltage $V_{HV}$, illustrated in FIG. 2 as the curve 13, also decreases with increasing beam current loading $I_0$. Because the ultor voltage sense voltage $V_{HV}$ directly measures the peak retrace pulse voltage developed across flyback transformer winding 31b rather than directly measuring the voltage at ultor terminal 93, the curve $V_{HV}$ is generally not as steeply a decreasing curve as the ultor voltage curve 12.

Curve 14 of FIG. 2 illustrates a curve of the collector voltage $V_c$ of transistor 73 as a function of beam current loading $I_0$. Between zero beam current loading and beam current loading of $I_{01}$, the collector voltage $V_c$ is proportional to the beam current sense voltage $V_{bc}$ that is coupled to the base of transistor 73 through resistor 69, with the proportionality constant being determined by the degenerative gain of the operational amplifier. Furthermore, when functioning as an operational amplifier with degenerative gain, transistor 73 maintains the collector voltage $V_c$ proportional to the base voltage substantially independent of the loading on the collector terminal through resistor 97 or resistor 59. Thus, as the beam current loading increases, the base voltage of transistor 73 decreases and the collector voltage $V_c$ increases as illustrated in FIG. 2, curve 14 between current loading points zero and $I_{01}$.

The beam current loading current point $I_{01}$ of FIG. 2 represents the maximum load current drawn on ultor terminal 93 and high voltage generator 30 that should exist under normal television receiver operating conditions. If excessive beam current draw is attempted, such as by setting the television receiver brightness control at its maximum setting, the beam limiter circuit 66 operates to limit the maximum draw to near that of current $I_{01}$.

If a fault condition should occur wherein the beam current loading is greater than the level $I_{01}$, high voltage protection circuit 88 disables normal television receiver operation by shutting down deflection generator 32 and high voltage generator 30. In accordance with the invention, the source of bias voltage $V_0$ developed at terminal 60 and coupled through resistor 59 to the collector of transistor 73 insures the shutdown of high voltage generator 30 under all overload conditions, even under extreme overload conditions such as may occur when the picture tube anode electrode is short-circuited to ground.

As illustrated by curve 13 of FIG. 2, the voltage $V_{HV}$ decreases with increasing beam current loading. Between current loading point $I_{01}$ and $I_{02}$, the sense voltage $V_{HV}$ is sufficiently greater than $V_{ref}$ to by itself activate comparator transistor 76 under an overcurrent condition without the aid of the bias voltage $V_0$. If, however, the overload is severe enough such that the current drawn from ultor terminal 93 exceeds the current $I_{02}$, the sense voltage $V_{HV}$ drops below the reference voltage $V_{ref}$ and is of insufficient magnitude to by itself activate comparator transistor 76.

With the additional bias voltage source coupled to the collector terminal of transistor 73 through resistor 59, a second source of voltage is available for applying to comparator transistor 76, in addition to the ultor sense voltage $V_{HV}$. The additional, bias voltage is applied only after transistor 73 becomes cut off. When no overload condition exists, that is to say, when the current being drawn from ultor terminal 93 is less than the current $I_{01}$, transistor 73 is conducting and the voltage at its collector is established by the beam current sense voltage $V_{bc}$. Under overload conditions, when the current drawn from ultor terminal 93 exceeds $I_{01}$, transistor 73 acts as a switch, to change conductive states into the cutoff state, thereby enabling the bias voltage $V_0$ to be applied to the input emitter electrode of comparator transistor 76.

As illustrated in FIG. 2, curve 14, the voltage $V_c$ increases substantially after the current point $I_{01}$ is reached to become the portion 14a of the curve 14. The bias voltage $V_0$ is selected to be sufficiently greater in magnitude than that of the reference voltage $V_{ref}$ to by itself reverse bias diode 80 and activate the comparator so as to develop the television receiver disabling signal in substantial independence of the value of the ultor voltage sense voltage $V_{HV}$ being developed at the moment that transistor 73 becomes cut off. Thus, even under extreme overload conditions, at current draws greater than $I_{02}$, sufficient voltage is available at terminal 70 to activate comparator transistor 76 even though the ultor voltage sense voltage $V_{HV}$ has decreased to levels much lower than the reference voltage $V_{ref}$.

The bias voltage is applied to the comparator only when the ultor beam current exceeds the predetermined level $I_{01}$ that is indicative of abnormal or overload high voltage generator operation. Absent an overload condition, the bias voltage $V_0$ has no significant effect on the ability of high voltage protection circuit 88 to disable television receiver operation under excessive high voltage conditions.

What is claimed is:

1. A protection circuit for a television display requiring an ultor voltage and drawing ultor beam current from an ultor terminal, comprising:
   a high voltage generator responsive to an alternating voltage for developing said ultor voltage at said ultor terminal;
   means responsive to said ultor voltage for developing a sense voltage representative thereof;
   means responsive to said ultor beam current for developing a sense voltage representative thereof;
   a comparator;
   means coupled to said comparator for developing a disabling signal when energized by said comparator;
   means coupled to said disabling signal developing means for applying said disabling signal to said television display such that an abnormal display is produced when said disabling signal developing means is energized;
   means for coupling said ultor voltage and ultor beam current sense voltages to said comparator to activate said comparator so as to develop said disabling signal when said ultor voltage exceeds a predetermined level, said predetermined level varying with variations in said ultor beam current sense voltage;
   a source of bias voltage, said bias voltage when applied to an input terminal of said comparator activating said comparator so as to develop said disabling signal in substantial independence of the value of said ultor voltage sense voltage; and
   means responsive to said ultor beam current sense voltage for applying said bias voltage to an input terminal of said comparator only when said ultor beam current exceeds a predetermined level indicative of abnormal high voltage generator operation.

2. A protection circuit according to claim 1 wherein said bias voltage applying means comprises an amplifier having an output terminal coupled to said bias voltage source and to said comparator input terminal and having an amplifier input terminal to said ultor beam current sense voltage developing means.

3. A protection circuit according to claim 2 wherein said amplifier includes means for providing negative feedback between said amplifier input and output terminals, said negative feedback becoming inoperative when said ultor beam current exceeds said predetermined level.

4. A protection circuit according to claim 3 including a voltage divider, said ultor voltage sense voltage developing means being coupled to a first terminal of said divider, said amplifier output terminal being coupled to a second terminal of said divider and said comparator input terminal being coupled to a third terminal of said divider intermediate the other two divider terminals.

5. A protection circuit according to claim 4 including a source of reference voltage coupled to another input terminal of said comparator and wherein said bias voltage is of greater magnitude than that of said reference voltage.

6. A protection circuit according to claim 3 wherein said negative feedback providing means comprises the series arrangement of a diode and an impedance coupled between said amplifier input and output terminals.

7. A protection circuit according to claim 6, including a television display deflection generator developing a retrace pulse voltage as said alternating voltage and wherein said high voltage generator comprises a flyback transformer having a first winding coupled to said deflection generator and having a high voltage winding for stepping up the retrace pulse voltage applied to said first winding, and a high voltage rectifier arrangement coupled to said high voltage winding for developing said ultor voltage.

8. A protection circuit according to claim 7 wherein said ultor voltage sense voltage developing means comprises a second winding of said flyback transformer and a rectifier coupled to said second winding.

9. A protection circuit for a television display requiring an ultor voltage and drawing ultor beam current from an ultor terminal, comprising:
a high voltage generator responsive to an alternating voltage for developing said ultor voltage at said ultor terminal;
means responsive to said ultor voltage for developing a sense voltage representative thereof;
means responsive to said ultor beam current for developing a sense voltage representative thereof;
a comparator;
means coupled to said comparator for developing a disabling signal when energized by said comparator;
means coupled to said disabling signal developing means for applying said disabling signal to said television display such that an abnormal display is produced when said disabling signal developing means is energized;
means coupled to said comparator for developing a summed voltage comprising a proportional summation of said ultor voltage sense voltage and said beam current sense voltage such that when said summed voltage exceeds a given value indicative of the development of an undesirable ultor voltage level said comparator is activated so as to energize said disabling signal developing means;
a source of bias voltage, said bias voltage when applied to said comparator activating said comparator so as to energize said disabling signal developing means; and
a switch coupled to said source of bias voltage and to said comparator, said switch changing switching states when an overcurrent fault condition occurs in said television display for applying said bias voltage to said comparator to produce an abnormal television display.

10. A protection circuit according to claim 9 wherein said overcurrent fault condition comprises a beam current overload condition of said high voltage generator and wherein said summed voltage developing means comprises a voltage divider having a first terminal coupled to said ultor voltage sense voltage developing means and wherein said switch comprises an operational amplifier having an input terminal coupled to said ultor beam current sense voltage developing means and an output terminal coupled to a second terminal of said voltage divider and to said bias voltage source, said operational amplifier being operated with negative feedback when said high voltage generator is not being beam current overloaded and being operated without said negative feedback when said high voltage generator is being overloaded.

11. A protection circuit according to claim 10 wherein said high voltage generator comprises a deflection generator producing a retrace pulse voltage and a flyback transformer having said retrace pulse voltage applied to a first winding of said transformer and having said ultor voltage developed from the voltage generated across a high voltage winding of said transformer.

12. A protection circuit according to claim 11 wherein said ultor voltage sense voltage developing means comprises a secondary winding of said flyback transformer, rectifying means coupled to said secondary winding and filtering means coupled to said rectifying means.

13. A protection circuit according to claim 12 wherein said negative feedback is developed by the series arrangement of a diode and an impedance coupled between said output and input terminals of said operational amplifier and wherein said diode becomes blocked during beam current overloading of said high voltage generator.

14. A protection circuit according to claim 9 wherein the value of said bias voltage exceeds that of the aforementioned given value indicative of the development of an undesirable ultor voltage level.

* * * * *